United States Patent [19]
Kreye

[11] Patent Number: 5,931,523
[45] Date of Patent: Aug. 3, 1999

[54] DEVICE FOR ENCLOSING THE BORDERS OF THE WINDOWS OF MOTOR VEHICLES

[75] Inventor: Bernhard Kreye, Wunstorf, Germany

[73] Assignee: Henniges Elastomer-und Kunststofftechnik GmbH & Co. KG, Rehburg-Loccum, Germany

[21] Appl. No.: 08/931,983

[22] Filed: Sep. 17, 1997

Related U.S. Application Data

[63] Continuation of application No. 08/564,003, Nov. 29, 1995, abandoned.

[30] Foreign Application Priority Data

Nov. 29, 1994 [EP] European Pat. Off. .............. 94118791

[51] Int. Cl.$^6$ ...................................................... B60J 10/02
[52] U.S. Cl. ............................................... 296/146.15
[58] Field of Search ....................... 52/204.591, 204.597, 52/208; 296/93, 96.21, 146.15, 201

[56] References Cited

U.S. PATENT DOCUMENTS 4,905,432  3/1990  Romie ........................................ 52/208

FOREIGN PATENT DOCUMENTS 121481   10/1984  European Pat. Off. .
610691    8/1994  European Pat. Off. .
3447271   6/1986  Germany .
3536806   4/1987  Germany .

Primary Examiner—Andrew C. Pike
Attorney, Agent, or Firm—Liniak, Berenato, Loangacre & White

[57] ABSTRACT

A device encloses the border of the window of a motor vehicle. The device includes an elastic frame formed as an angled strip of a flexible, ductile metal or of a thermoplastic. The angled strip includes a leg portion projecting beyond the outer edge of the window. The leg portion turns inward towards the window and forms an encircling channel adapted to receive a trim strip. The angled strip is shaped such that a portion adjacent the planar surface of the window is spaced apart from the surface of the window to define a channel. The angled strip is provided with through-passages allowing the introduction of an adhesive or an adhesive plastic into the channel. The adhesive passes through the through-passages, into the channel, in the direction of the window surface to adhere the window to the angled strip. For this purpose, it is provided according to the invention that the through-passages are designed and arranged such that they are in connection with the channel which permits the adhesive to run onto the end surface of the window.

2 Claims, 5 Drawing Sheets

DEVICE FOR ENCLOSING THE BORDERS OF THE WINDOWS OF MOTOR VEHICLES

This is a Continuation application of U.S. Ser. No. 08/564,003 filed on Nov. 29, 1995, now abandoned.

BACKGROUND OF THE INVENTION

1. Field of the Invention

The invention relates to a device for enclosing the border of the windows of motor vehicles and more particularly to a device which allows adhesive to adhere to the end of the window.

2. Description of the Prior Art

The devices of the prior art provide an encircling channel which serves to receive an adhesive or adhesive plastic. However, in these prior art arrangements, the end surface of the window remains free of adhesive because there is no channel to allow adhesive to flow from the side surface of the window to the end surface of the window. The failure to fix the end surface of the window results in a greater spacing from the end surface of the window and the associated carrier flange resulting in lower stability.

Accordingly it is an object of this invention to avoid the drawbacks of the prior art and allow the end surface of the window to receive an adhesive.

SUMMARY OF THE INVENTION

The object according to the present invention provides an angled strip having through-passages designed and arranged such that they are in connection with a channel which permits the adhesive to run onto the end surface of the window.

A flexible frame formed as an angled strip is placed adjacent a planar surface of a window. The angled strip is provided with a leg portion projecting beyond an outer edge portion of the window. The leg portion turns back inward towards the window to form an encircling channel. The encircling channel is adapted to receive a trim strip. The angled strip is shaped such that a channel is formed between the angled strip and the planar surface of the window. Through passages are formed on the angled strip to allow the introduction of an adhesive into the channel. The channel communicates with the encircling channel to allow adhesive to flow and adhere to the end surface of the window.

Further advantages of the embodiments of the arrangement according to the invention are set forth in the detailed description of the preferred embodiment and in the following description of the Figures.

DETAILED DESCRIPTION OF THE PREFERRED EMBODIMENT

Figure 1:
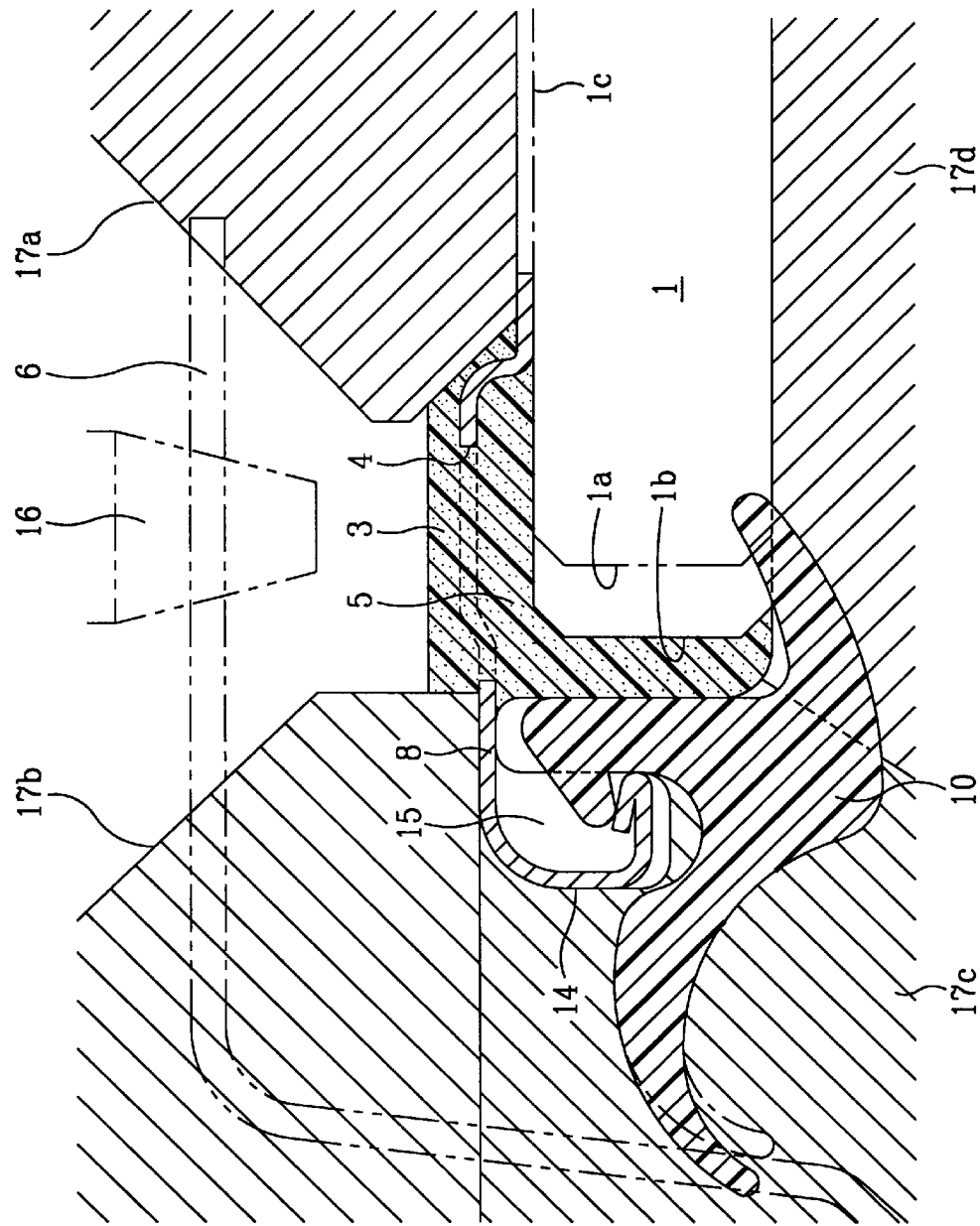
FIG. 1 shows, in section, a side view of an exemplary embodiment of the arrangement according to the invention, in which the angled strip consists of metal.

FIG. 1 shows a motor-vehicle window 1, with an end surface 1a positioned respect to an end-side adhesive 3, and particularly portion 1b of the adhesive 3. The adhesive 3 is a sealing compound connecting the window to an elastic frame formed as an angled strip. The adhesive extends through the angled strip 8, via through-passages 4, filling a channel 5 which is defined by an area located between the outer surface of the window 1 and an inner surface of the angled strip. The angled strip 8 of FIG. 1 is preferably made of metal. The adhesive 3 extends around a corner of the window 1 to adhere to the end surface 1a.

Figure 2:
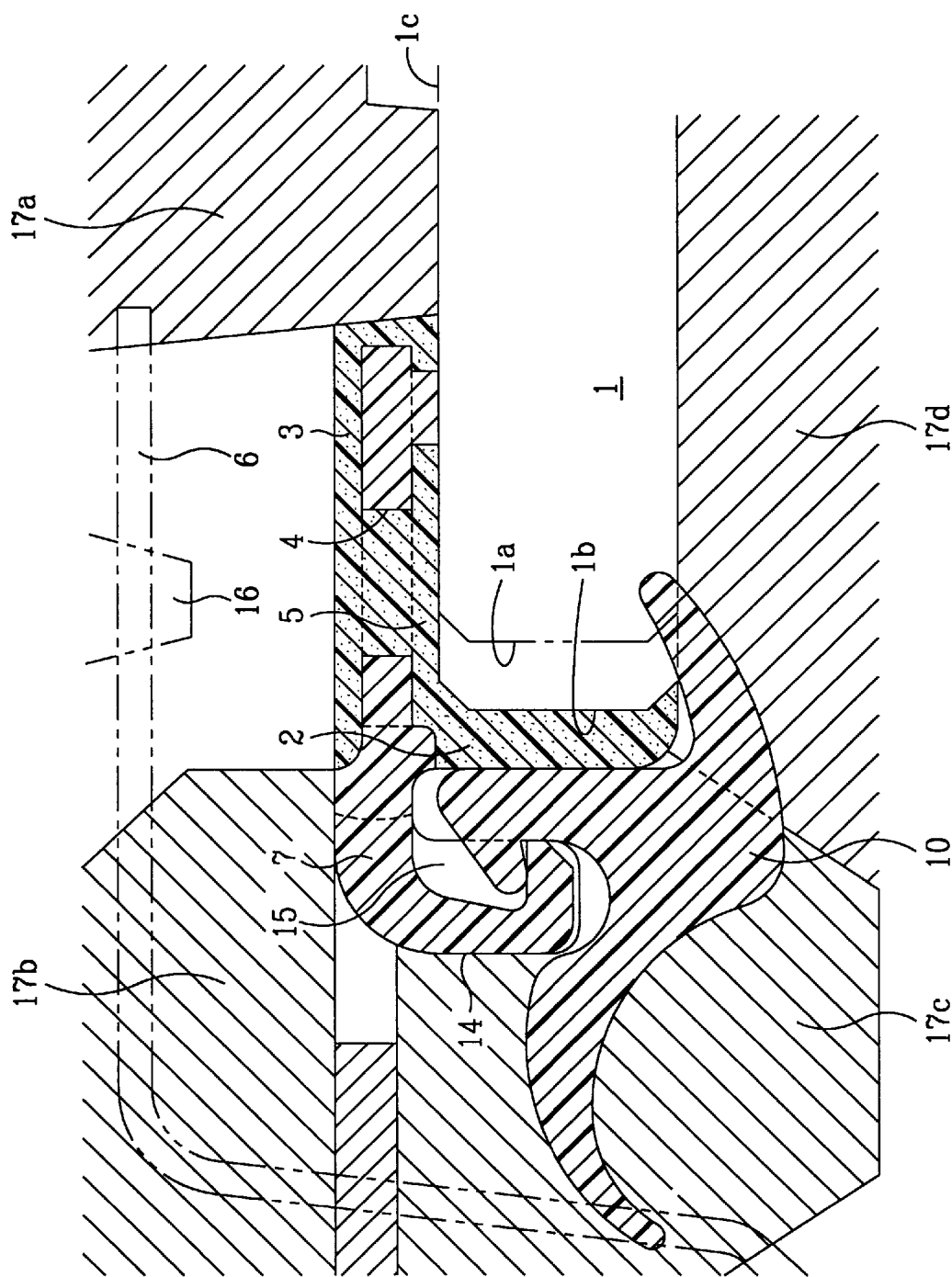
FIG. 2 shows a representation similar to FIG. 1, in which the angled strip consists of plastic.

FIG. 2 shows a second embodiment of the claimed invention similar to the device shown in FIG. 1. However, the angled strip 7 is made of a plastic material.

Figure 3:
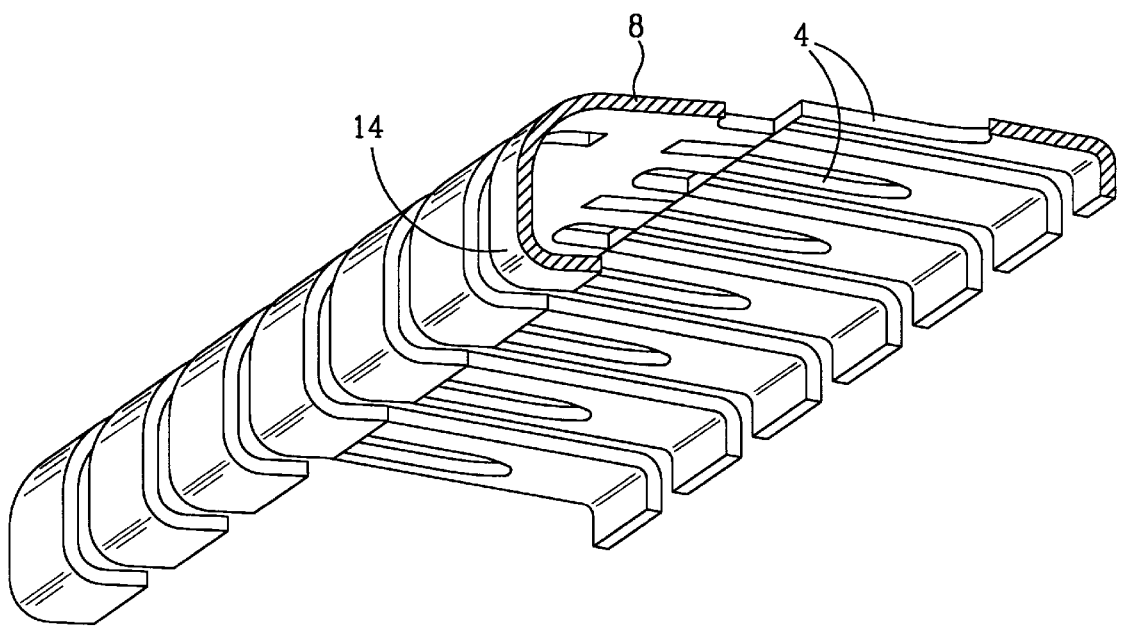
FIG. 3 shows a perspective representation of a portion of the angled strip.

FIG. 3 shows a perspective representation of an embodiment of the invention where the angled strip is made of metal.

Figure 4:
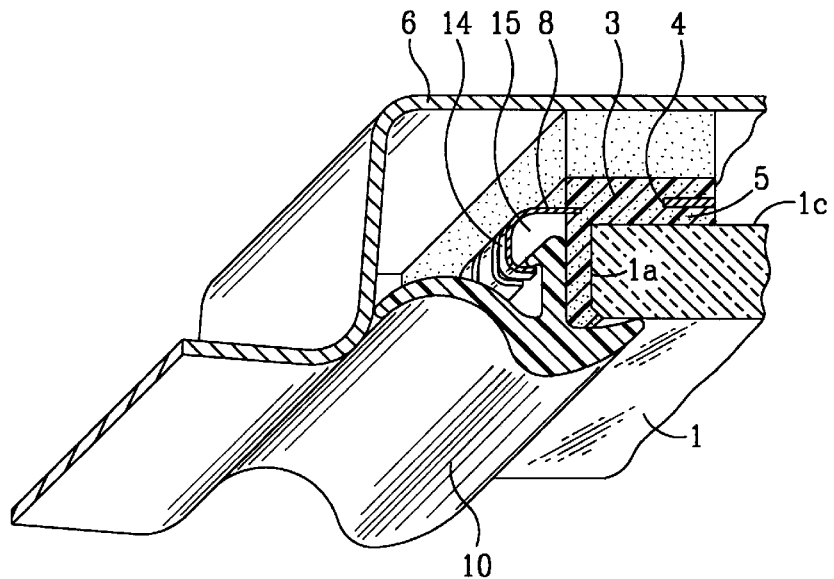
FIG. 4 shows a perspective representation of the assembled parts of the embodiment with the angled strip as shown according to FIG. 3.

In FIG. 4, the assembled device with the angled strip shown in FIG. 3 is represented such that the individual parts can be seen in perspective. As can be seen from FIG. 4, the window is secured by a trim strip 10 which can be introduced in an elastic manner and supplements the rest of the securing means.

Figure 6:
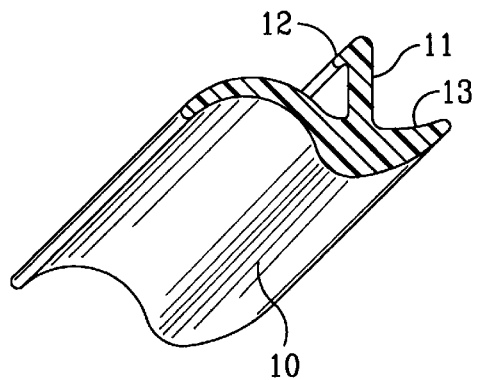
FIG. 6 shows a perspective view of a trim strip.
Figure 7:
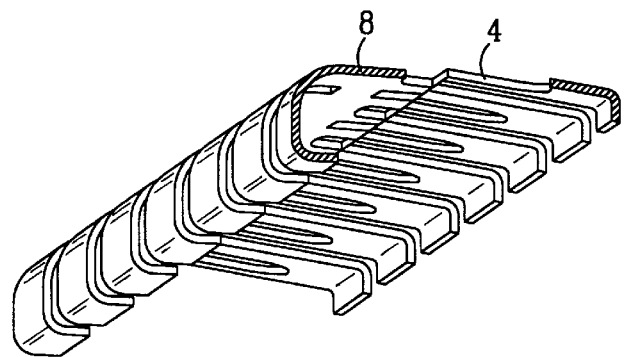
FIG. 7 shows a perspective view of the angled strip according to one embodiment of the claimed invention.
Figure 5:
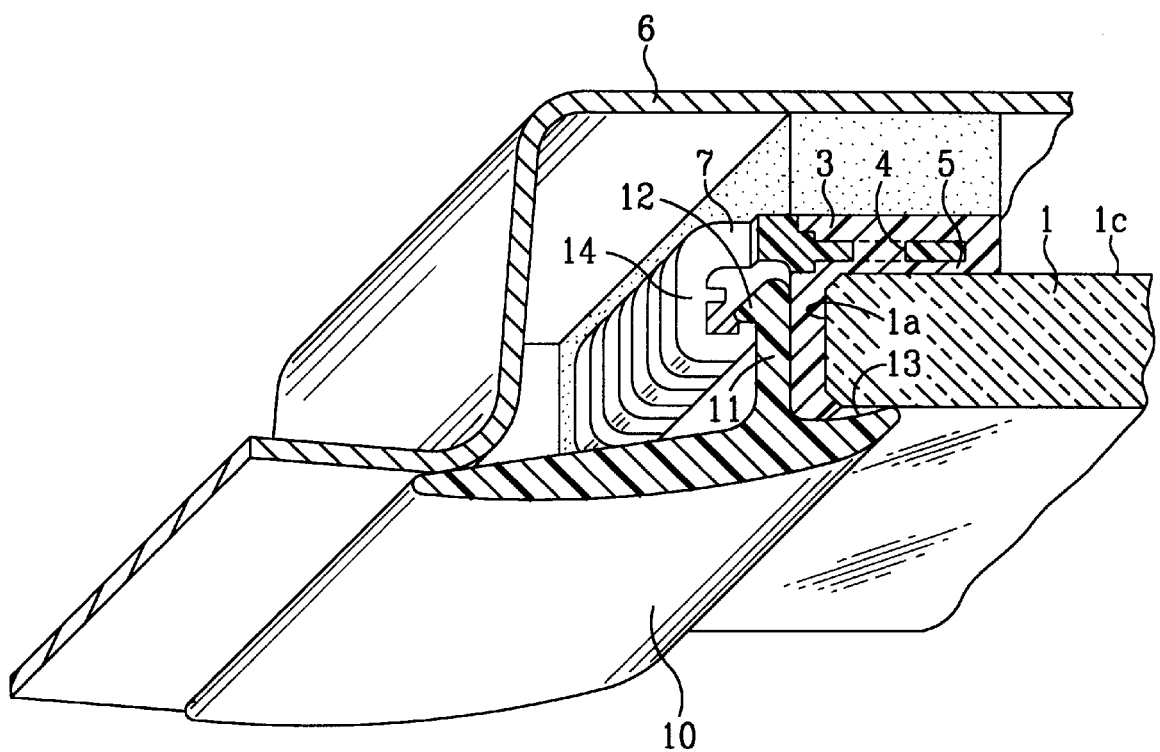
FIG. 5 shows, in the assembled state, a further embodiment of the arrangement according to the invention.

FIGS. 6 and 7 represent perspective views of the unassembled angled strip 8 and trim strip 10. These individual moldings are represented such that they are not in engagement with one another. In this embodiment, the angled strip consists of metal, whereas it consists of plastic in the otherwise identical FIG. 5. An angled strip consisting of plastic results in the exterior spacings being greater, with the result that, overall, securement is wider and more compact than in the situation where a metal angled strip is used.

Referring to FIG. 4, the angled strip 8 is positioned substantially parallel and adjacent to window 1. The shape of the angled strip is such that a substantial portion of the angled strip rests spaced apart from the planar surface 1c of the window 1 forming a channel 5. A leg portion 14, of the angled strip 8, extends beyond the end surface 1a of the window 1. The leg portion 14 turns back inward towards the window to form an encircling channel 15. The encircling channel 15 and leg portion 14 are adapted to receive and retain an extension member 11 and tang 12 of the trim strip. The tang 12 engages the leg portion to retain the trim strip 10. Tab 13 extends to engage the side of the window 1.

The angled strip 8 is partially embedded in an adhesive 3. The angled strip 8 has through passages 4 to allow the adhesive 3 to continuously extend into the channel 5 and around the corner of the window and adhere to the entire end surface 1a of the window. Adhesive 3 is disposed between the extension member 11 of the trim strip 10 and the end surface 1a of the window 1 to form a secure border.

Referring now to FIG. 1, the angled strip 8, window 1, and trim strip 10 are arranged in place in work holders 17a–d. An adhesive is applied from applicator 16. The arrangement is such that the adhesive flows in and through through-passages 4 into channel 5 and around the corner of the window to adhere to the entire end surface 1a of the window. When the adhesive cures, the work holders are removed and the device is complete. A bodywork flange 6 serves to secure the window as represented by the chain dotted line.

While the device of this invention has been shown and described with respect to a particular embodiment, it is understood to those possessing skill in the art that various changes to the form and detail may be made therein without departing from the spirit and scope of the invention.

I claim:

1. A combination device for enclosing a border of a window of a motor vehicle and a trim strip, said window having first and second planar surfaces and an end surface substantially perpendicular to said first and second planar surfaces, said device comprising:

an angled strip having a first portion substantially positioned parallel to and spaced apart from said first planar surface of said window, said first portion having at least one through-passage formed therethrough to expose a first channel defined by a space between said first portion and said first planar surface, and a leg portion extending from said angled strip, said leg portion being defined by a first member extending beyond said end surface of said window substantially parallel to said planar surfaces and substantially coplanar with said first portion, a second member extending from said first member substantially orthogonally therefrom inward towards said first planar surface of said window and substantially parallel to said end surface, and a third member extending from said second portion substantially parallel to said first member and substantially orthogonal to said second member, said third portion extending towards said end surface and terminating at an end spaced apart from said end surface; and an adhesive continuously and substantially embedding opposite sides of said first portion of said angles strip, said adhesive communicating through said through-passage substantially filling said first channel and continuously extending around a corner of said window adhering to both said first planar surface and said end surface of said window to adhere said angled strip thereto, wherein said adhesive and said first, second, and third portions of said leg portion of said strip together define an encircling channel, and said trim strip having a tab engaging said window, and an extension member and a tang member each disposed within said encircling channel, wherein said tang member engages said third portion of said leg portion of said angled strip to retain said trim strip thereto.

2. The combination according to claim 1, wherein said first portion of said angled strip is completely embedded in said adhesive.

* * * * *